(12) United States Patent
Hung et al.

(10) Patent No.: US 12,546,854 B2
(45) Date of Patent: Feb. 10, 2026

(54) MULTI-AXIS RADAR SYSTEM

(71) Applicant: MIN CHUN PRECISION CO., LTD., New Taipei (TW)

(72) Inventors: I-Chun Hung, New Taipei (TW); Chih-Hung Yeh, New Taipei (TW); Chien-Hung Pan, New Taipei (TW); Yi-Cheng Chang, New Taipei (TW)

(*) Notice: Subject to any disclaimer, the term of this patent is extended or adjusted under 35 U.S.C. 154(b) by 321 days.

(21) Appl. No.: 18/385,912

(22) Filed: Nov. 1, 2023

(65) Prior Publication Data
US 2024/0230835 A1     Jul. 11, 2024

Related U.S. Application Data

(60) Provisional application No. 63/478,899, filed on Jan. 6, 2023.

(51) Int. Cl.
*G01S 7/03* (2006.01)

(52) U.S. Cl.
CPC ........................... *G01S 7/03* (2013.01)

(58) Field of Classification Search
CPC .......................................................... G01S 7/03
USPC .......................................................... 342/146
See application file for complete search history.

(56) References Cited

U.S. PATENT DOCUMENTS

| | | | | |
|---|---|---|---|---|
| 3,953,857 A * | 4/1976 | Jenks | ........................ | H01Q 3/34 343/705 |
| 4,156,874 A * | 5/1979 | Kopis | ................... | G01S 7/0231 342/365 |
| 5,933,120 A * | 8/1999 | Manasson | ............... | H01Q 13/28 343/788 |
| 6,803,875 B1 * | 10/2004 | Alford | .................. | G01S 13/951 342/188 |
| 7,333,064 B1 * | 2/2008 | Timothy | ................ | H01Q 1/125 343/705 |
| 7,760,129 B1 * | 7/2010 | Knight | .................... | G01S 7/025 342/188 |
| 8,305,279 B2 * | 11/2012 | Young | .................... | H01Q 1/125 343/765 |

(Continued)

FOREIGN PATENT DOCUMENTS

| | | | | |
|---|---|---|---|---|
| CN | 110441765 B | | 7/2021 | |
| CN | 114400430 A | * | 4/2022 | ............... H01Q 1/50 |

(Continued)

*Primary Examiner* — Nuzhat Pervin
(74) *Attorney, Agent, or Firm* — OPES IP Consulting Co., Ltd.

(57) ABSTRACT

The disclosure is a multi-axis radar system that includes a base, a first control module, a second control module, and a waveguide. The first control module includes a horizontal rotatable azimuth elevation axis device, an S-band single-channel rotary connector, and a spin ring. In contrast, the second control module includes a vertical rotatable axis device and an X-band single-channel rotary connector. The waveguide is composed of four portions, each with its axis. The first and second portions are inside the cylindrical body of the base, and the third portion is coaxially arranged with the second control module. The fourth portion is outside the multi-axis radar system. The disclosure includes a broadband bipolar mmWave antenna consisting of two substrates, a parasitic element, a patch, and two feeding lines. The system is designed for efficient radar operation and precise data collection.

20 Claims, 13 Drawing Sheets

(56) References Cited

U.S. PATENT DOCUMENTS

| | | | |
|---|---|---|---|
| 8,373,589 B2 * | 2/2013 | McLaughlin | H01Q 3/08 |
| | | | 343/753 |
| 10,484,110 B2 * | 11/2019 | Vikstedt | H04W 24/06 |
| 10,511,090 B2 * | 12/2019 | Clifford | H01Q 3/005 |
| 12,215,969 B2 * | 2/2025 | Binder | G01S 15/42 |
| 2008/0169963 A1 * | 7/2008 | White | G01S 7/22 |
| | | | 342/357.53 |
| 2013/0154870 A1 * | 6/2013 | Mills | G01S 7/4026 |
| | | | 342/174 |
| 2015/0054703 A1 * | 2/2015 | Yano | H01Q 21/064 |
| | | | 343/762 |
| 2015/0177377 A1 * | 6/2015 | Moreira Neto | G01S 13/426 |
| | | | 342/25 R |
| 2018/0109000 A1 * | 4/2018 | Lim | G01S 13/06 |
| 2018/0127952 A1 * | 5/2018 | Magliulo | G01S 13/885 |
| 2020/0049814 A1 * | 2/2020 | Neidhardt | G01S 7/4026 |
| 2020/0241122 A1 * | 7/2020 | Achour | G01S 13/931 |
| 2021/0135370 A1 * | 5/2021 | Hamminga | H01Q 25/005 |
| 2021/0141078 A1 * | 5/2021 | Ahmadloo | G01S 13/42 |
| 2021/0175619 A1 * | 6/2021 | Clifford | H01Q 3/06 |

FOREIGN PATENT DOCUMENTS

| | | | | |
|---|---|---|---|---|
| CN | 115246488 A | | 10/2022 | |
| CN | 217766825 U | | 11/2022 | |
| EP | 1418442 A1 | * | 5/2004 | G01S 13/931 |
| EP | 2360491 A1 | * | 8/2011 | G02B 6/3604 |
| EP | 3418768 A1 | * | 12/2018 | G01S 13/003 |
| JP | 2006308510 A | | 11/2006 | |
| KR | 20140115815 A | * | 10/2014 | G01S 7/02 |
| WO | WO-2018046673 A1 | * | 3/2018 | G01S 13/536 |

\* cited by examiner

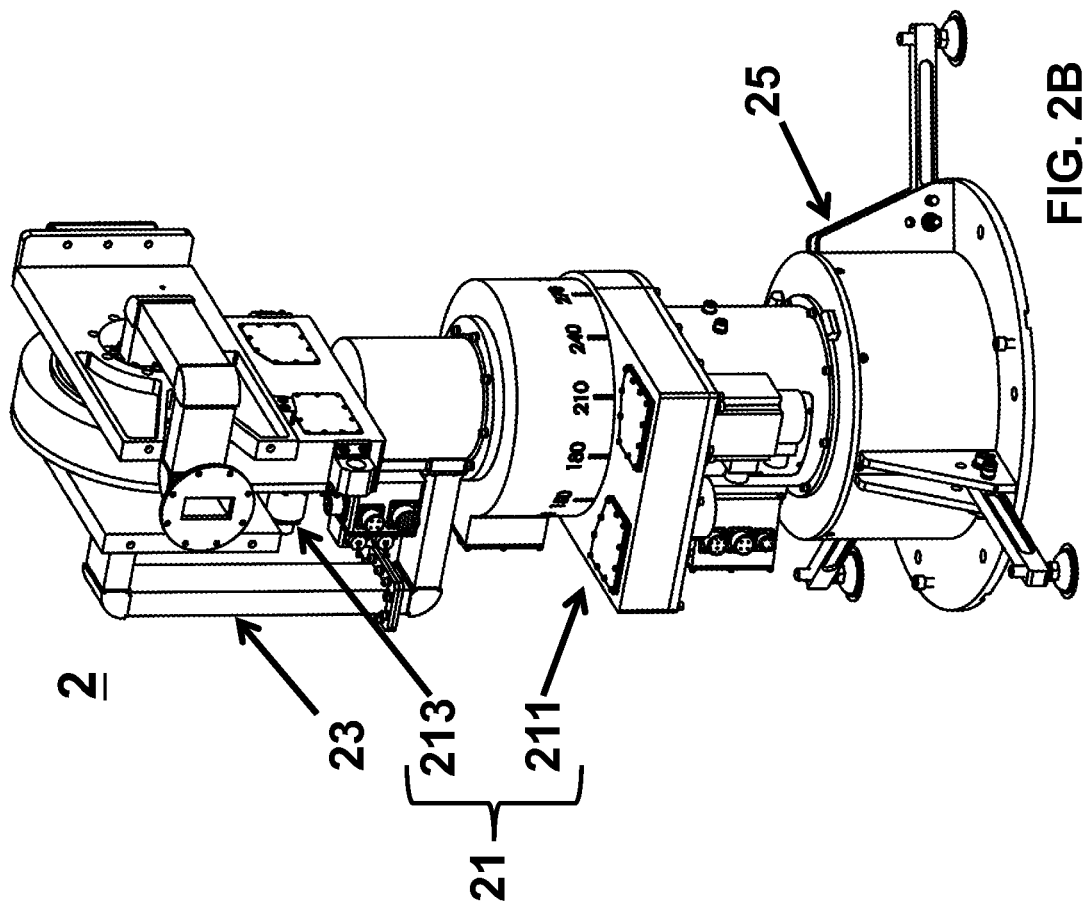
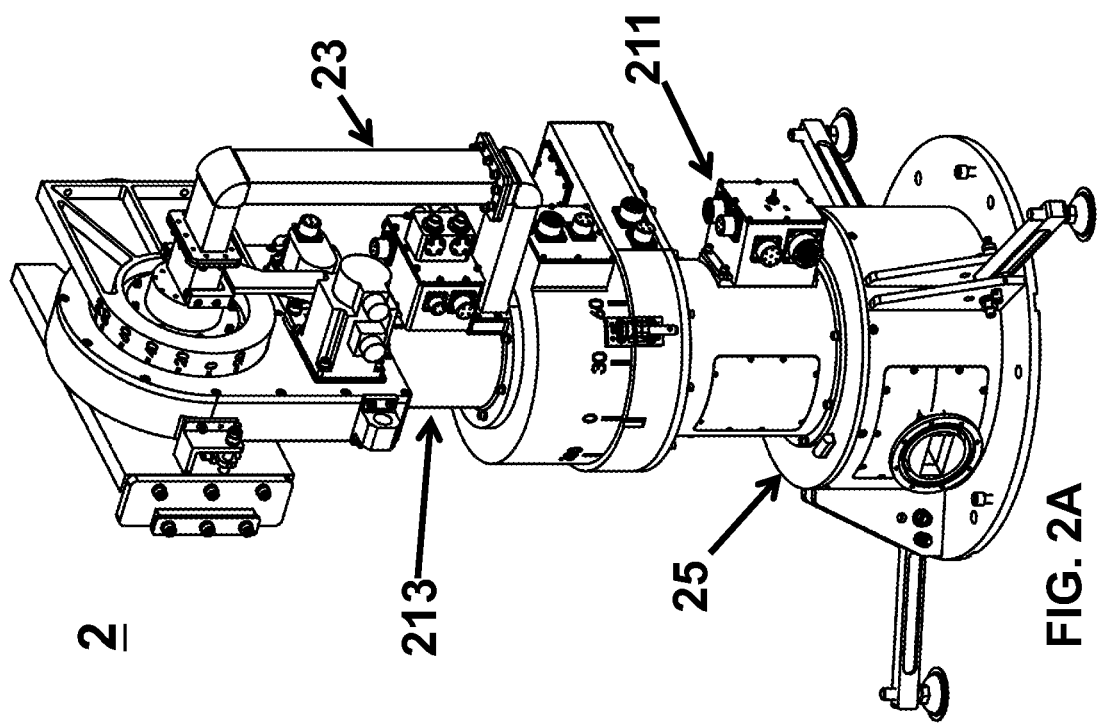

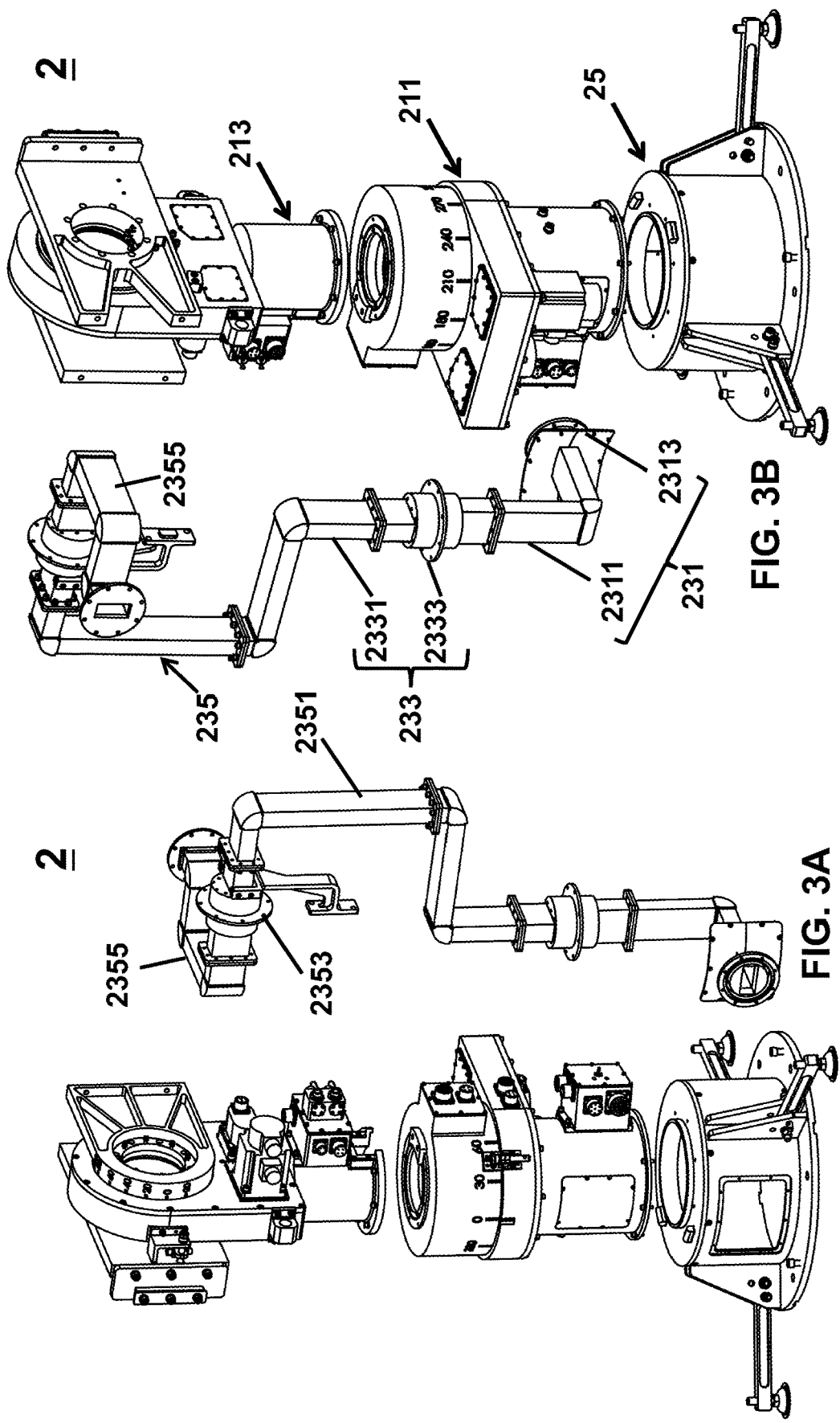

MULTI-AXIS RADAR SYSTEM

CROSS-REFERENCES

The present application claims priority to U.S. Provisional Application Ser. No. 63/478,899, filed on Jan. 6, 2023, which are hereby incorporated by reference in their entirety.

BACKGROUND OF THE DISCLOSURE

Radar technology has profoundly shaped a multitude of sectors by enabling the detection and tracking of objects through the emission and reception of electromagnetic waves. In its conventional form, radar systems function by emitting radiofrequency signals and analyzing the reflections from targets. This foundational technology has found widespread use in domains ranging from military surveillance and meteorology to air traffic control and navigation.

However, the efficacy of conventional radar systems is inherently limited due to their singular focus on specific observation directions. These systems typically employ stationary antenna configurations, which restrict their ability to cover expansive fields of view without manual adjustments. As a result, blind spots emerge in regions beyond their immediate line of sight, rendering them susceptible to evasion tactics.

Efforts to overcome this limitation have led to the deployment of multiple radar units, each dedicated to monitoring a distinct observation direction. However, this approach introduces challenges related to data integration, synchronization, and coordination. The independent operation of these discrete radar units often leads to inconsistencies in tracking, potentially undermining the overall accuracy and reliability of the surveillance system.

In order to expand coverage across a wider range of observation angles, previous endeavors have yielded intricate radar installations. These setups frequently incorporate azimuth and elevation rotation mechanisms to facilitate limited multi-axis tracking. Nevertheless, such configurations bring their own set of challenges, including heightened mechanical complexity, increased maintenance demands, and elevated power consumption.

Despite these efforts, existing radar technology remains encumbered by its inability to provide a comprehensive and efficient solution for multi-axis tracking and monitoring. The limitations of current radar systems persistently impact their suitability for applications where real-time and precise target detection are imperative.

This underscores the urgency for pioneering radar solutions that transcend the constraints of established technology. These innovative solutions should seamlessly incorporate multi-axis tracking capabilities into streamlined designs, obviating blind spots and simplifying coordination challenges. Addressing these issues is pivotal for enhancing the accuracy, efficiency, and adaptability of radar systems in contexts where dependable target detection is paramount.

SUMMARY OF THE DISCLOSURE

In light of the above imperatives, the present disclosure introduces a novel multi-axis radar system that redefines the landscape of target tracking and monitoring. By departing from traditional radar paradigms, this inventive system seeks to surmount the limitations of single-direction observation and eliminate the complexities inherent in multi-unit installations. By amalgamating advanced mechanical components with sophisticated control modules, the multi-axis radar system facilitates seamless tracking along multiple axes. The integration of specialized components, such as S-band and X-band single-channel rotary connectors, horizontal and vertical rotatable axis devices, and purpose-designed waveguides, forms the bedrock of this groundbreaking technology. These elements collaboratively establish comprehensive coverage of the environment, ensuring the absence of blind spots and enabling the effective tracking of targets from all angles.

Furthermore, the multi-axis radar system optimizes data integration and coordination efficiency. Through coaxial arrangements and strategic placement, the system harmonizes the synchronization of information from diverse tracking axes, enhancing target identification accuracy and trajectory prediction precision. In summary, the constraints of existing radar technology in delivering multi-axis tracking capabilities have catalyzed the innovation detailed within this patent application. Leveraging advanced engineering principles, the multi-axis radar system reimagines radar capabilities, setting a new standard for precision, versatility, and dependability in tracking and monitoring applications. Subsequent sections of this patent application delve into intricate specifics of the multi-axis radar system's design, components, operational principles, and potential applications. This holistic exploration aims to convey a comprehensive understanding of the disclosure's significance within the radar technology landscape and its capacity to revolutionize a multitude of industries. One of the aspects of the present disclosure is to provide a broadband bipolar mmWave antenna with low manufacturing cost and simple manufacturing process.

The present disclosure provides a multi-axis radar system including a waveguide system, a support module, a first control module and a second control module. Further, the waveguide system includes a footer section, a middle section, and a top section. The footer section and the middle section can be rotated horizontally relative to each other, and the middle section and the top section can be rotated vertically relative to each other. In addition, the footer section of the waveguide system enters from a side of the support module and exits upwards from the top of the support module to connect with the middle section of the waveguide system. The first control; module includes a horizontal azimuth rotating device having a spin ring and a first resolver. Moreover, a portion of the middle section of the waveguide is coaxially arranged with the horizontal azimuth rotating device, and the first control module is installed on the support module. The second control module includes a vertical rotatable axis device and a second resolver. Further, a portion of the top section of the waveguide system is coaxially arranged with the vertical rotatable axis device, wherein the second control module is installed on the horizontal azimuth rotating device.

In one embodiment, the support module comprises a bracket device.

In one embodiment, the middle section comprises a first single-channel rotary connector used to connect with the footer section.

In one embodiment, the top section comprises a second single-channel rotary connector used to connect with the middle section.

In one embodiment, a loadable weight of the vertical rotatable axis device is about ≥10 kg.

In one embodiment, a rotation angle of the horizontal azimuth rotating device is 360 degrees.

In one embodiment, the horizontal azimuth rotating device does not have a maximum rotation angle.

In one embodiment, a rotation angle of the vertical rotatable axis device is about −10 to +100 degree.

In one embodiment, a frequency of the signal transmitted by the waveguide system is about 2 to 4 GHz.

In one embodiment, a frequency of the signal transmitted by the waveguide system is about 7 to 11.2 GHz.

In one embodiment, an insertion loss of the waveguide system is about ≤0.4 dB.

In one embodiment, a gear used in the horizontal azimuth rotating device or the vertical rotatable axis device has a precision and the precision is ≥AGMA Quality No. 8.

In one embodiment, a gear used in the horizontal azimuth rotating device or the vertical rotatable axis device has a precision and the precision is ≤JIS Quality No. 6.

In one embodiment, a resolution of the first resolver or the second resolver is 0.1 to 0.5 degree/bit.

In one embodiment, an angular velocity of vertical or horizontal rotation of the multi-axis radar system is about ≥30 degree/sec.

In one embodiment, an angular velocity of vertical or horizontal rotation of the multi-axis radar system is about ≥120 degree/sec.

In one embodiment, a weigh of the multi-axis radar system is about ≤100 kg.

In one embodiment, a vertical or horizontal error angle is less than about 0.2 degrees when the multi-axis radar system is placed in an environment with maximum average wind speeds of 40 knots or gusts of 50 knots.

In one embodiment, an X-axis extends through the center of rotation of the first control module and axially, and a Y-axis extends through the center of rotation of the second control module and axially. Further, the angle between the X-axis and the Y-axis is always 90 degrees.

In one embodiment, the multi-axis radar system further includes a computer and an antenna. Further, the computer is connected with an end of the footer section of the waveguide system and the antenna is connected with a free end of the top section of the waveguide system. The computer is electrically connected with the multi-axis radar system.

In one embodiment, the antenna is ≥10 kg.

BRIEF DESCRIPTION OF DRAWINGS

FIGS. 2A-2D illustrate a three-dimensional schematic diagram of the multi-axis radar system from different perspectives and FIG. 2E shows an exploded three-dimensional schematic diagram of the present multi-axis radar system.

FIGS. 3A-3B illustrate a second embodiment of the waveguide system.

DETAILED DESCRIPTION OF THE DISCLOSURE

The present disclosure relates to radar systems and, more particularly, to a multi-axis radar system capable of precise and versatile tracking and monitoring in multiple directions.

Unless defined otherwise, all technical and scientific terms used herein have the same meanings as commonly understood by one of skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present disclosure provides a multi-axis radar system that revolutionizes target tracking and monitoring capabilities by seamlessly integrating advanced mechanical components with sophisticated control modules. This innovative system is designed to overcome the limitations of conventional radar technology, enabling comprehensive multi-axis coverage while streamlining coordination and data integration.

The architecture of the multi-axis radar system is meticulously designed to facilitate precise and versatile target tracking across multiple axes, all while ensuring streamlined coordination and integration of data.

Figure 1:
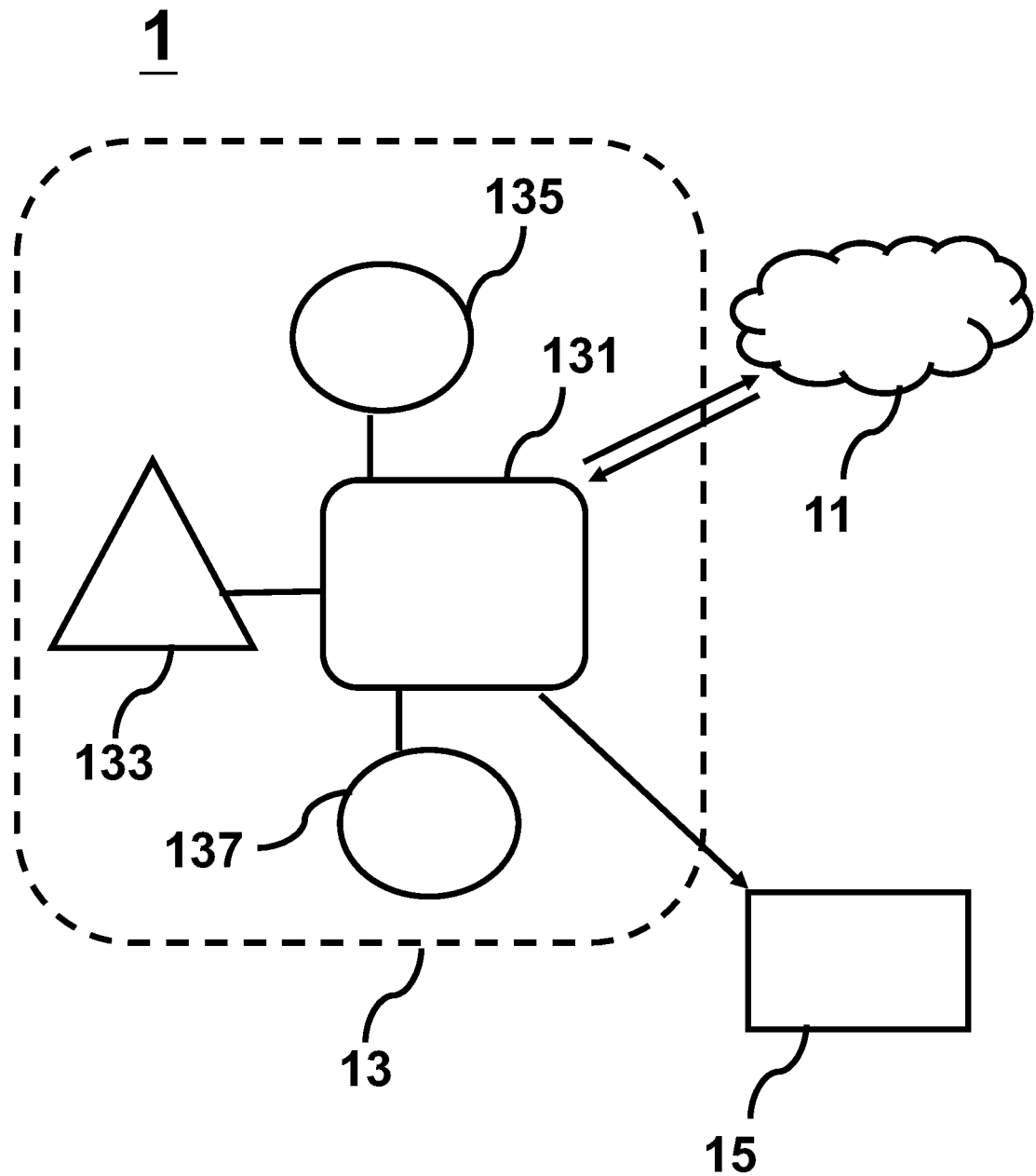
FIG. 1 illustrates an embodiment of the multi-axis radar system of the present disclosure.

Reference is made to FIG. 1, which illustrates a first embodiment of the multi-axis radar system of the present disclosure. The first embodiment exemplifies a comprehensive control system 1 encompassing a range of interconnected components, each contributing to the system's functionality and effectiveness. In this embodiment the heart of the control system 1 is a remote server 11, which serves as the central processing hub of the radar system. The remote server 11 acts as the brain of the operation, facilitating data processing, analysis, and communication between various components. This centralized control ensures that the radar system operates with accuracy, real-time responsiveness, and seamless coordination. In another embodiment, the comprehensive control system 1 include a server (not shown in the figure) that can provide the same functionality and purpose as the remote server 11, but it is worth noting that the control system 1 and the server are physically connected. The display unit 15 serves as the interface through which operators interact with the radar system. Through the display unit 15, operators can visualize the tracked targets, monitor radar data, configure tracking parameters, and make informed decisions based on real-time information. The display unit 15 offers a user-friendly platform that enhances the radar system's usability and accessibility.

Central to the radar system 13 is a set of core components that enable the multi-axis tracking capabilities. The CPU 131 (Central Processing Unit) stands as a crucial processing unit within the radar system architecture. It orchestrates the complex tasks of data acquisition, signal processing, and communication with other components. Through its computational power, the CPU 131 ensures that the radar system operates with efficiency and accuracy. The power unit 133, linked to the CPU 131, provides the necessary energy to sustain the radar system's operations. This power unit 133 ensures that all components receive the required electrical supply, facilitating continuous tracking and monitoring. By maintaining a stable power supply, the power unit 133 guarantees that the radar system operates reliably even in demanding operational conditions. The vertical rotatable axis device 135 and the horizontal azimuth rotating device 137 are pivotal components responsible for enabling multi-axis tracking. The vertical rotatable axis device 135 facilitates vertical movement, allowing the radar system to track targets across different elevation angles. The horizontal azimuth rotating device 137, on the other hand, empowers the radar system to scan the azimuthal (horizontal) plane, providing comprehensive coverage of the surrounding environment.

In summary, the first embodiment of the multi-axis radar system exemplifies a sophisticated control system 1 that incorporates a remote server 11, a display unit 15, and core components such as the CPU 131, power unit 133, vertical rotatable axis device 135, and horizontal azimuth rotating device 137. Through the intricate interaction of these components, the radar system achieves unparalleled multi-axis tracking capabilities, providing operators with real-time insights and situational awareness across a wide range of applications.

Figure 2C:
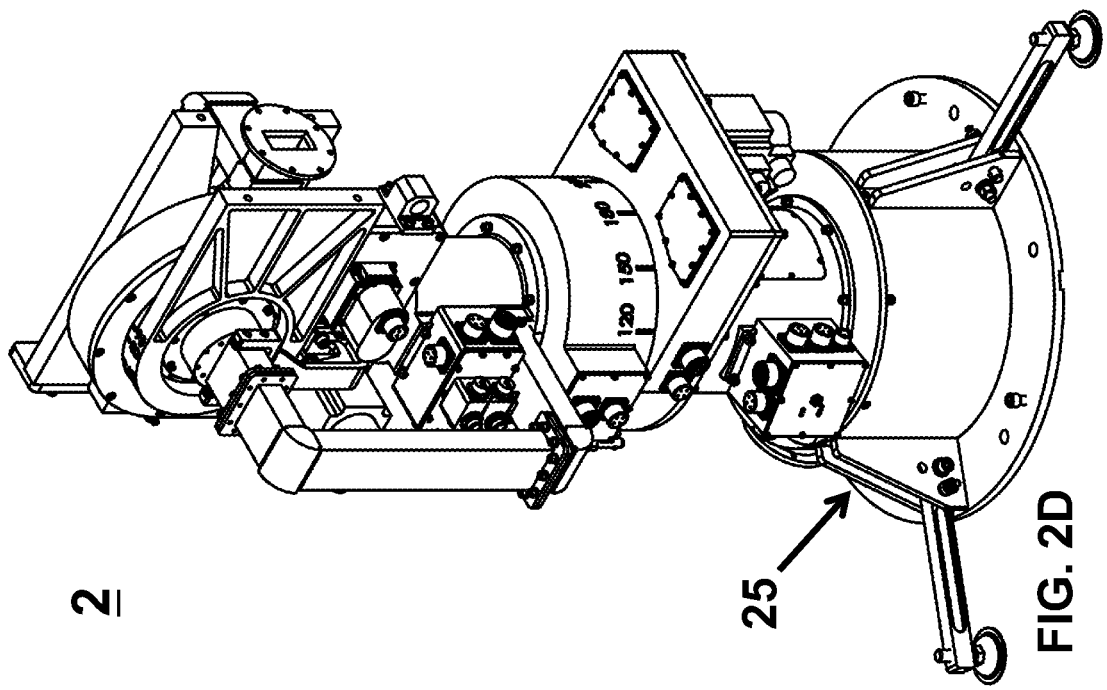
Figure 2D:
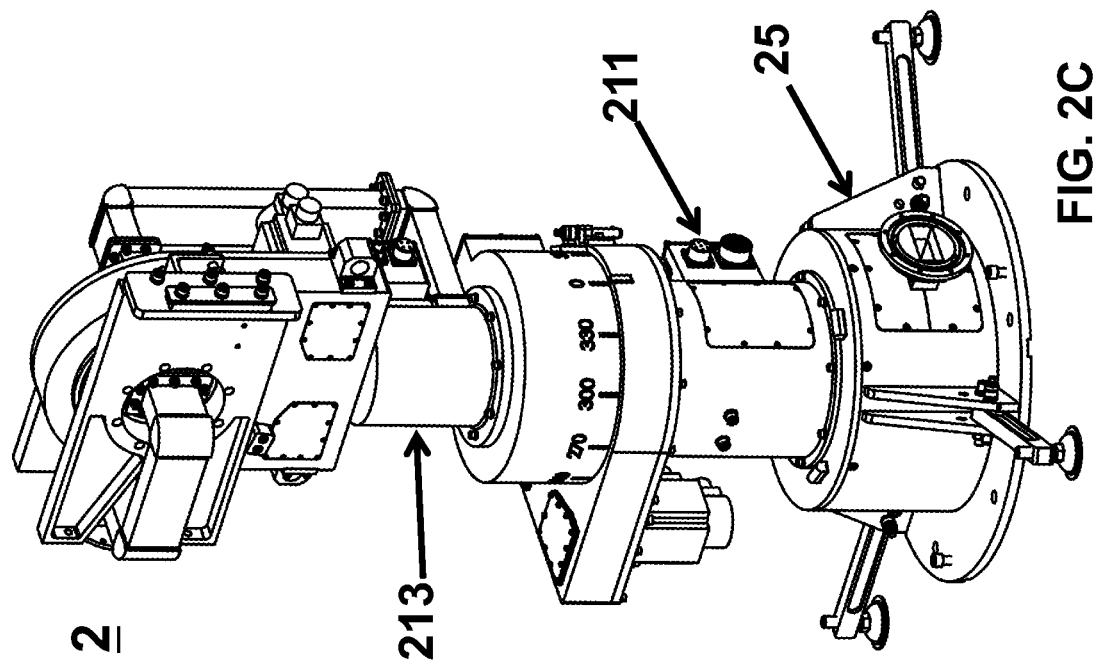

Please refer to FIGS. 2A to 2D, the figures disclose an embodiment of the multi-axis radar system 2. FIG. 2A discloses a stereoscopic schematic view of the multi-axis radar system 2 from a specific angle, while FIG. 2B displays a mirrored schematic view of FIG. 2A, revealing the specific structure of the opposite side of the multi-axis radar system 2. Additionally, FIG. 2C shows a stereoscopic schematic view of the multi-axis radar system 2 from a different angle, perpendicular to the viewing angle of FIG. 2A. Finally, FIG. 2D mirrors FIG. 2C, showing the specific structure of the other side of the multi-axis radar system 2. As the FIGS. 2A to 2E show, the multi-axis radar system 2 mainly includes a control module 21, a waveguide System 23 and a support module 25. Further the control module 21 includes a first control module 211 and a second control module 213.

Figure 2E:
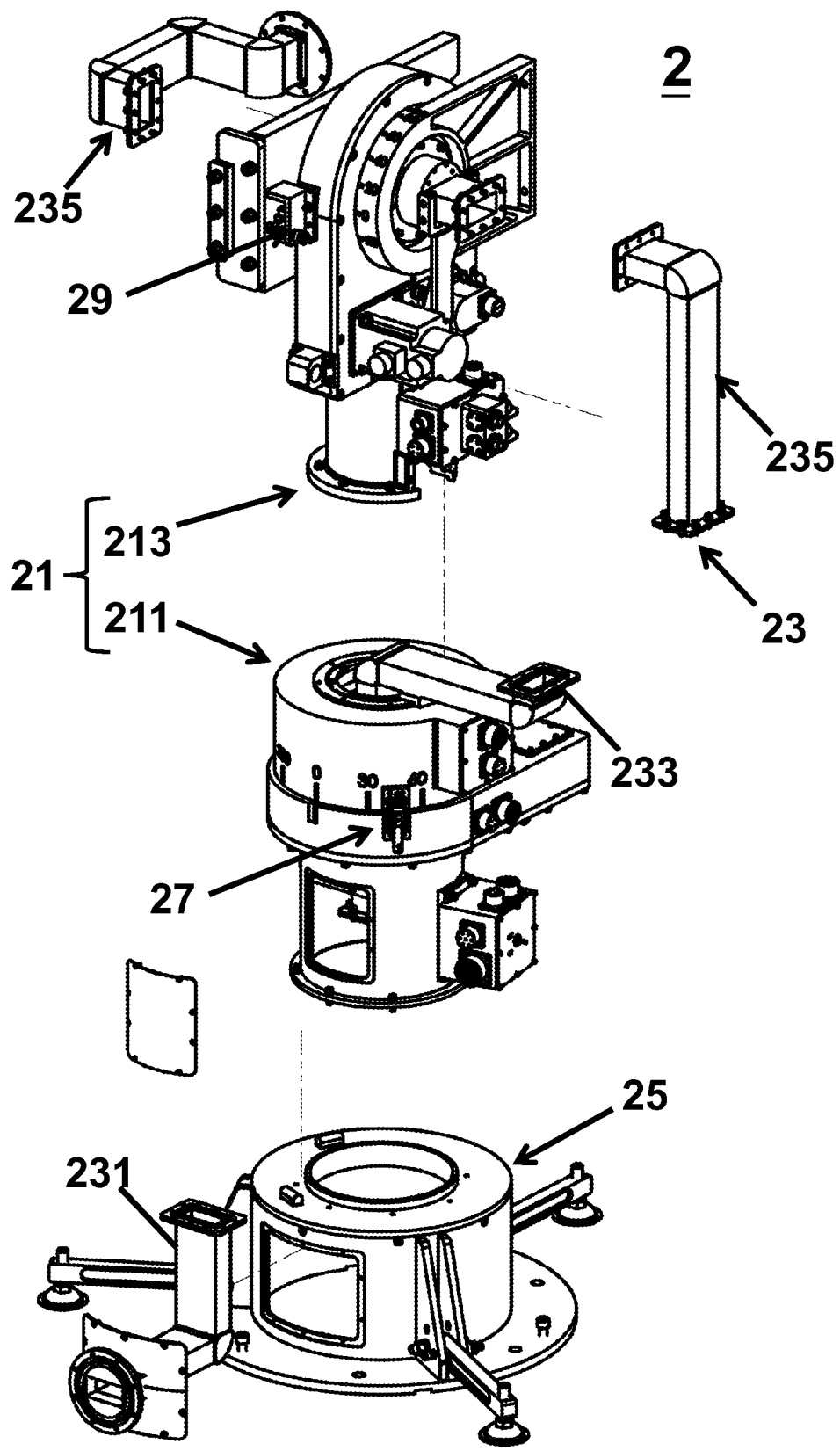

Please refer to FIG. 2E, it shows an exploded three-dimensional schematic diagram of the multi-axis radar system 2. From the figure, it is clear that one end of the waveguide System 23 is located on the side face of the support module 25 with an opening, and the other end is connected to the radar disc (not shown in the figure). Furthermore, the middle part of the waveguide System 23 passes through the entire multi-axis radar system 2 (i.e., the support module 25, the first control module 211 and the second control module 213) separately. Different parts in the corresponding multi-axis radar system 2 (the support module 25, the first control module 211 and the second control module 213), the waveguide System 23 can be further divided into three sections (a footer section 231, a middle section 233 and a top section 235). In addition, the first control module 211 includes a first locking mechanism 27 and the second control module 213 includes a second locking mechanism 29. The first locking mechanism 27 and the second locking mechanism 29 are used to ensure that when the multi-axis radar system 2 is moved during transportation, no horizontal or vertical rotation occurs and to protect the parts and system structure within the first control module 211 and the second control module 213. Specifically, the locking mechanism 27 or the second locking mechanism 29 in the present embodiment is a locking ping assembly. It worth knowing that an X-axis (not shown in the figure) extends through the center of rotation of the first control module 211 and axially, and a Y-axis (not shown in the figure) extends through the center of rotation of the second control module 213 and axially. Further, the angle between the X-axis and the Y-axis is always 90 degrees.

FIGS. 3A and 3B illustrate an embodiment of the waveguide System 23 in the multi-axis radar system 2. FIGS. 3A and 3B are mirror images of each other. Furthermore, in this implementation, the waveguide System 23 refers to the S-band waveguide system. The signal frequency transmitted by the waveguide system 23 in the S-band is 2 to 4 GHz, which preferably is 2.5-3 GHz (with a standing wave ratio of ≤1.5 dB) and the insertion loss is ≤0.4 dB. As shown in the figures, the waveguide System 23 is a continuous hollow tube column. Central to the functionality of the multi-axis radar system 2 is the sophisticated waveguide system 23, a network of interconnected components designed to facilitate the transmission and reception of radar signals with precision and efficiency. As previous mentioned, the waveguide system is divided into distinct portions (i.e., the footer section 231, the middle section 233 and the top section 235), each serving a specific purpose in the signal transmission process. The footer section 231, strategically integrated within the radar system's architecture, plays a crucial role in initiating signal propagation.

Central to the functionality of the multi-axis radar system 2 is the waveguide system 23, responsible for the transmission and reception of radar signals. Each portion of the waveguide system 23 fulfills specific functions. The footer section 231 incorporates a first L-shaped duct 2311 and a first feeding port 2313. The first L-shaped duct 2311 is positioned within the support module 25 of the multi-axis radar system 2, facilitating the internal propagation of radar signals. The first L-shaped duct 2311 is engineered to minimize signal loss and interference, ensuring that the radar signals remain coherent and undistorted. Connected to the first L-shaped duct 2311 is the first feeding port 2313, extending externally from the support module 25, providing a conduit for signal output. In other words, the first feeding port 2313 serves as the entry point for radar signals, allowing for the smooth transition of signals from the internal components to the external environment.

The middle section 233 of the waveguide system 23 is composed of a second L-shaped duct 2331 and a first single-channel rotary connector 2335. The two ends of the first single-channel rotary connector 2333 are connected and linked respectively with the second L-shaped duct 2331 and the first L-shaped duct 2311. The sections of the first L-shaped duct 2311 and the second L-shaped duct 2331, which connected to the first single-channel rotary connector 2335 on both ends, and the first single-channel rotary connector 2333 itself are arranged in coaxial alignment. Further, they are arranged in coaxial alignment with the first control module 211 and the support module 25. This axis is oriented perpendicular to the rotation direction of a horizontal rotatable azimuth elevation axis device of the multi-axis radar system 2. The strategic positioning and arrangement of the first L-shaped duct 2311, the second L-shaped duct 2331 and the first single-channel rotary connector 2333 enable effective interaction with the rotating components of the first control module 211, ensuring unhindered rotational movement. This alignment ensures that the waveguide system 23 accommodates the rotational movement of the radar system's tracking components. The middle section 233 serves as a conduit through which radar signals are transmitted and received, allowing for accurate and synchronized signal exchange during the tracking process. It is worth noting that on the other side of the first single-channel rotary connector 2333, it emerges from the top of the first control module 211 and extends further from the bottom side of the second control module 213 to connect with one end of the top section 235. Furthermore, the second L-shaped duct 2331 is a pivotal component responsible for coordinating signals between the control modules and the waveguide system 23. The second L-shaped duct 2331 integrates two axes, both carefully aligned to facilitate accurate signal transmission. One axis corresponds to a vertical rotatable axis device of the second control module 213, aligning the vertical tracking capability with the waveguide system 23.

The following will further explain the top section 235 of the waveguide system 23. The top section 235 introduces critical components that enable the coordination of radar signals between the control modules and the waveguide system 23. As the figures show that the top section 235 is composed of a third L-shaped duct 2351, a second single-channel rotary connector 2353 and a U-shaped duct 2355. One end of the third L-shaped duct 2351 is connected to the second L-shaped duct 2331 as previous mentioned, and the other end is connected to second single-channel rotary connector 2353. Further, one end of the third L-shaped duct 2351 is connected to the second single-channel rotary connector 2353, and the other end is connected to a radar disc-shaped receiver (not shown in the figure). It worth knowing that only the second single-channel rotary connector 2353 of the top section 235 is configured within the second control module 213. This configuration enables the seamless propagation of signals between the horizontal and vertical tracking components. The U-shaped duct 2355 extends externally from the second control module 213, ensuring that the radar signals remain coherent even beyond the system's boundaries.

Figure 3C:
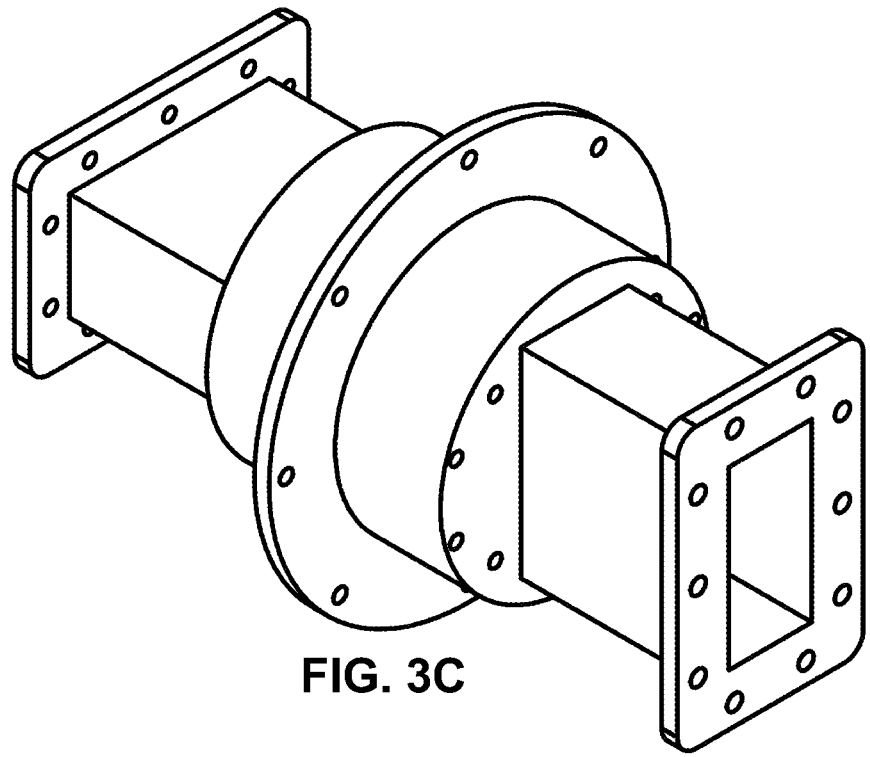
FIGS. 3C-3D illustrate a second embodiment of the single-channel rotary connector of the present multi-axis radar system.
Figure 3D:
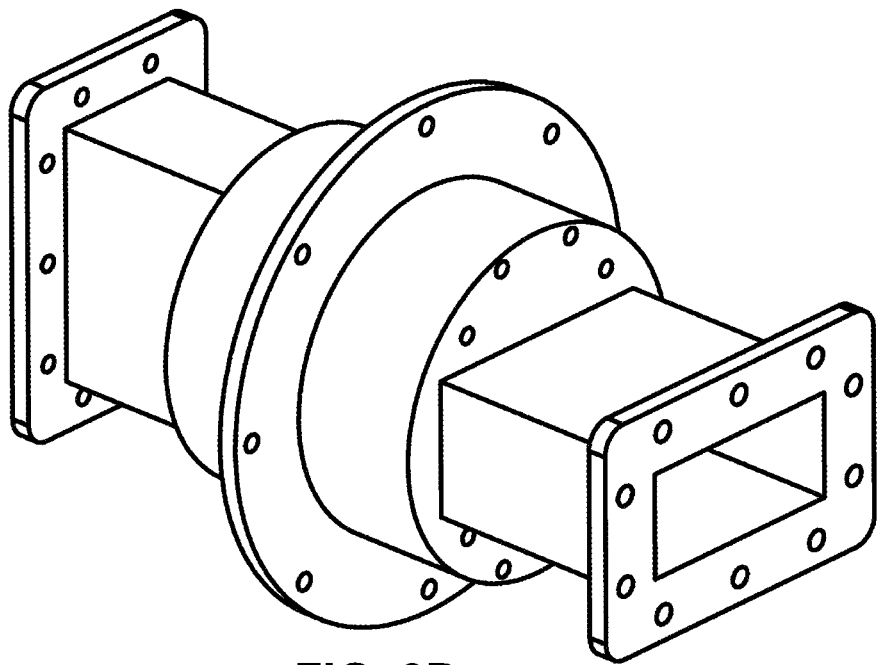
Figure 4A:
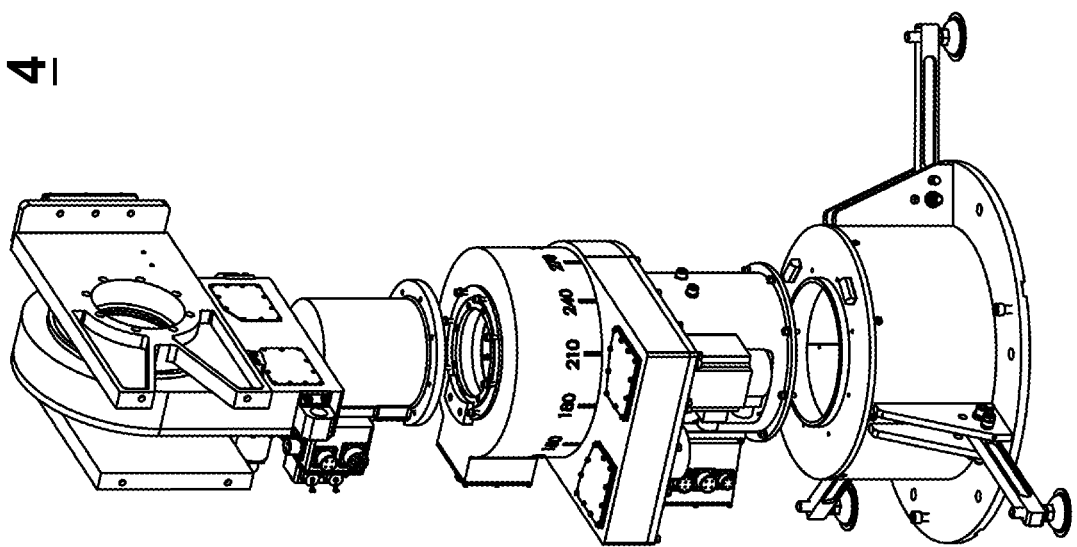
FIGS. 4A-4B illustrate a second embodiment of the waveguide system.
Figure 4A:
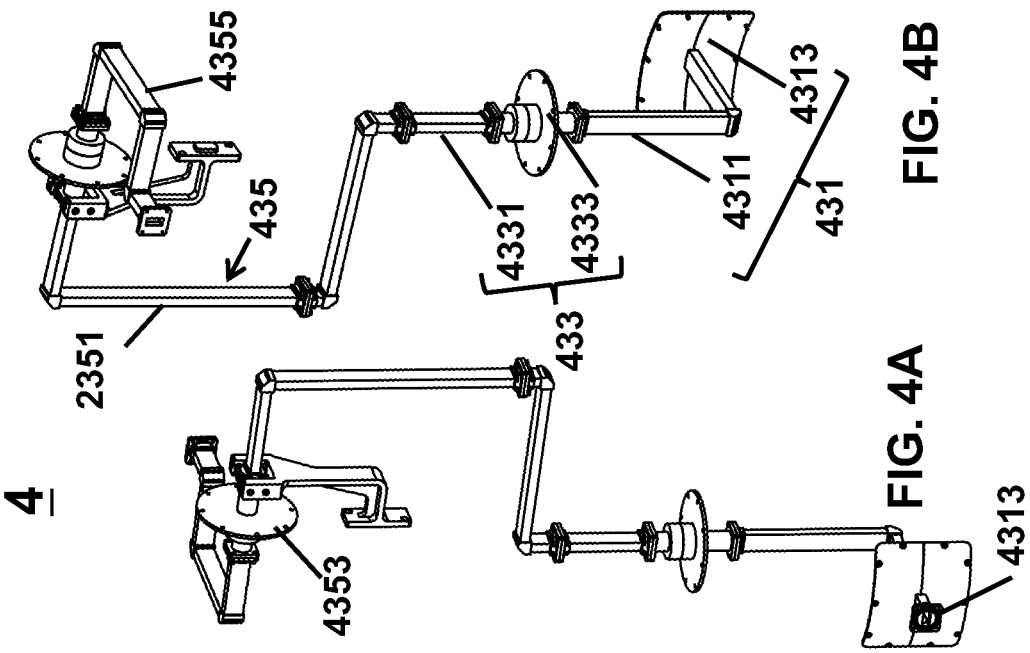
Figure 4B:
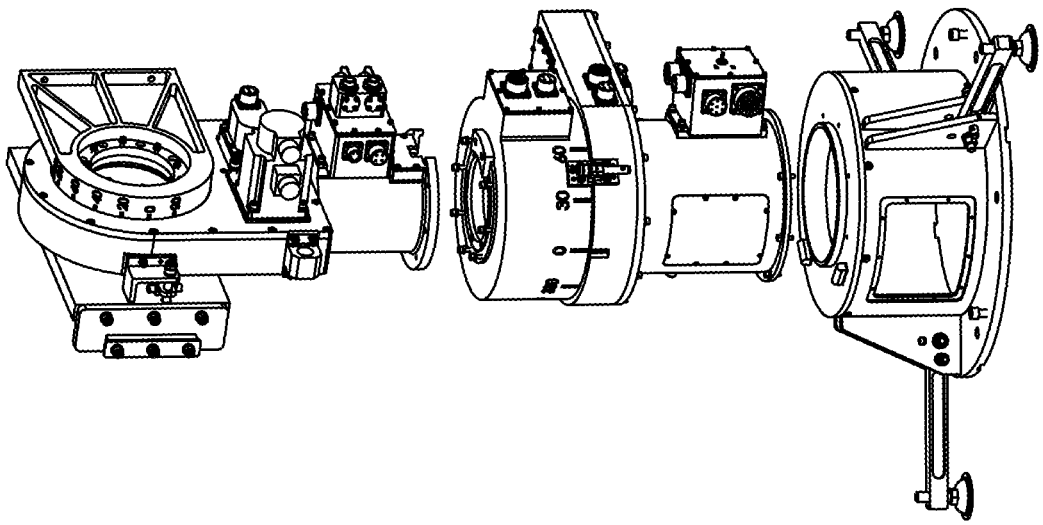
Figure 4C:
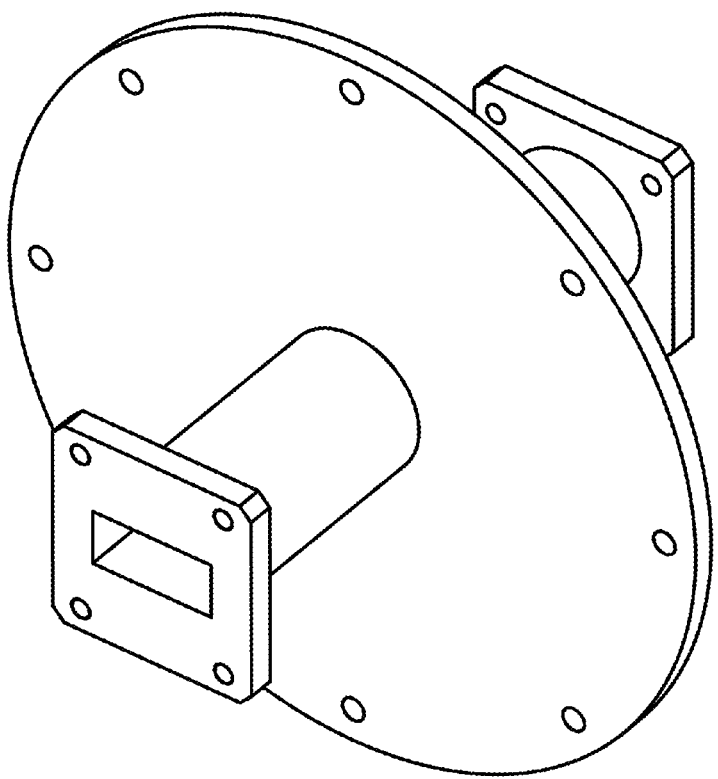
FIGS. 4C-4D illustrate a second embodiment of the single-channel rotary connector of the present multi-axis radar system.
Figure 4D:
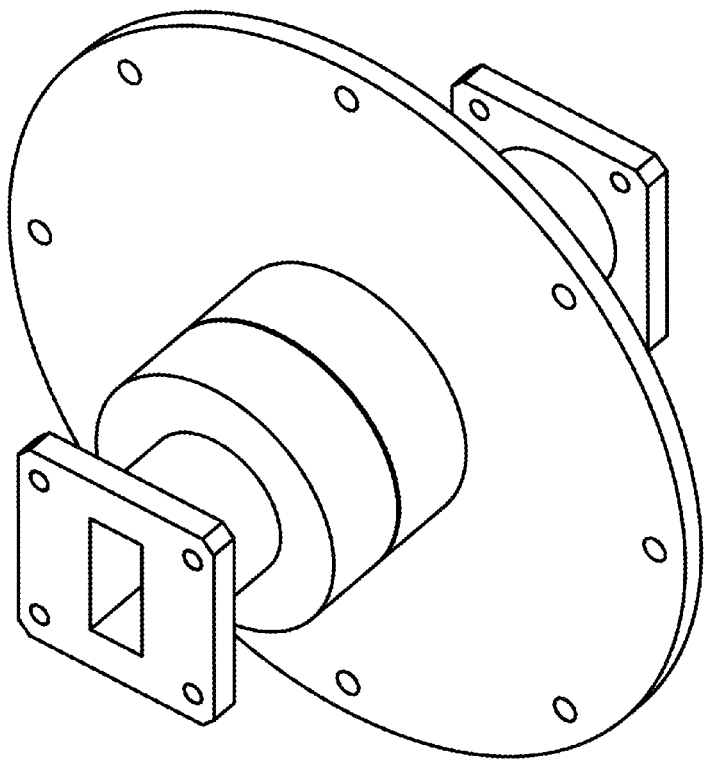

FIGS. 3C and 3D are an embodiment of the first single-channel rotary connector 2333 and the second single-channel rotary connector 2353. More specifically, in this example, the first single-channel rotary connector 2333 and the second single-channel rotary connector 2353 are used to transmit the S-band signal. As previous mentioned, the signal frequency transmitted by the first single-channel rotary connector 2333 and the second single-channel rotary connector 2353 in the S-band is 2 to 4 GHz, which preferably is 2.5-3 GHz (with a standing wave ratio of ≤1.5 dB), and it is worth knowing that the insertion loss is ≤0.4 dB. Further, the first single-channel rotary connector 2333 and the second single-channel rotary connector 2353 are the same in the present embodiment. However, in another embodiment, the first single-channel rotary connector 2333 and the second single-channel rotary connector 2353 can be designed differently according to individual needs. In summary, the architecture of the multi-axis radar system 2 is an intricate assembly of components that provides unprecedented tracking capabilities by integrating mechanical precision with advanced control modules and optimized waveguide systems 23. The waveguide system 23 is a meticulously engineered network that facilitates the transmission and reception of radar signals with precision, ensuring accurate and comprehensive target tracking across multiple axes. This interconnected architecture guarantees that the radar system's data remains coherent, reliable, and accessible, ultimately contributing to the system's accuracy, versatility, and operational effectiveness.

Please refer to FIGS. 4, the figures provide another embodiment of the waveguide system of a multi-axis radar system. Specifically, the different between the multi-axis radar system 4 (see FIG. 4) and the multi-axis radar system 2 (see FIG. 2) majorly is the waveguide system, and the control module (i.e., the first control module and the second control module) and the support module are the same. The waveguide system 43 of the multi-axis radar system 4 is used to transmit the X-band signal. As same as the waveguide system 23, the waveguide system 43 is also composed of a footer section 431, a middle section 433 and a top section 435. Further, the footer section 431 includes a first L-shaped duct 4311 and a first feeding port 4313; the middle section 433 includes a second L-shaped duct 4331 and a first single-channel rotary connector 4333; and the top section 435 includes a third L-shaped duct 4351, a second single-channel rotary connector 4353 and a u-shaped duct 4355. The signal frequency transmitted by the waveguide system 43, the first single-channel rotary connector 4333 and the second single-channel rotary connector 4353 in the X-band is 7 to 11.2 GHz, which preferably is 9.0 to 9.5 GHz (with a standing wave ratio of ≤1.5 dB) and the insertion loss is ≤1.8 dB. Moreover, the signal insertion loss in the first single-channel rotary connector 4333 and the second single-channel rotary connector 4353 is ≤0.4 dB.

Figure 5:
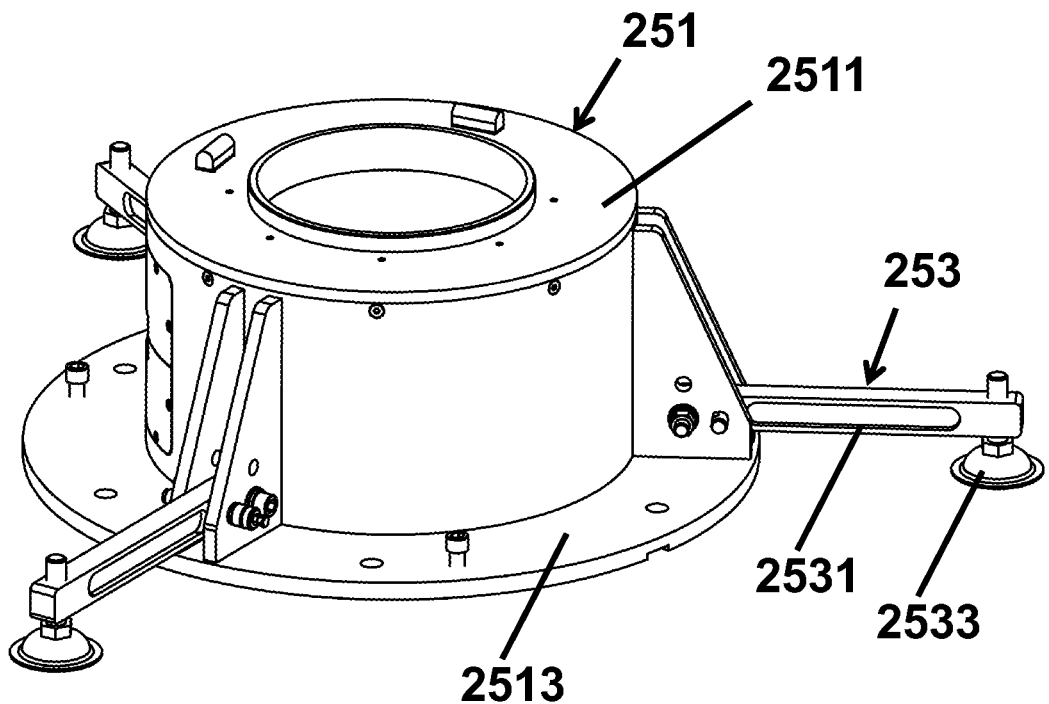
FIG. 5 illustrates an embodiment of a support module of the present multi-axis radar system.

The following will further introduce the structure and functions of the main modules of the multi-axis radar system 2. Please refer to FIG. 5, it discloses an embodiment of the support module 25. At one of the cores of the system lie the support module 25, a foundational component that provides stability, structural integrity, and support. In the present embodiment, the support module 25 contains a main structure unit 251 and an auxiliary structure unit 253. Specifically, the main structure unit 251 is a cylindrical body 2511 with a more extensive bottom area base 2513 so that the entire multi-axis radar system 2 can stand securely at a target location through the main structure unit 251. The main structure unit 251 acts as a protective enclosure, safeguarding the intricate components of the multi-axis radar system 2 from environmental factors such as weather conditions and external debris. Further, the auxiliary structure unit 253 can enhance the ability to fix the support module 25 in its mounting position and ensure that the entire multi-axis radar system 2 will not move during operation.

In the present embodiment, the auxiliary structure unit 253 is a bracket 2531 made of metal materials, with one end connected to the main structure unit 251 and the other end having a small base 2533. The metal material can be an alloy or a single metal, and it is important that the metal material can resist corrosion from moisture or acid in the air. Preferably, the bracket 2531 is made of stainless steel. Furthermore, the auxiliary structure unit 253 is designed to be easily connected to the main structure unit 251 in the present embodiment. In other words, since the multi-axis radar system 2 is primarily a portable radar system, the auxiliary structure unit 253 can be folded and stored to reduce the overall volume for easy transport. When the multi-axis radar system is moved to a target location, the bracket 2531 can be further unfolded and secured. In other embodiment, users can increase the number or types of the auxiliary structure unit 253 as needed to provide the most robust support. In other embodiment, the main structure unit 251 can be directly mounted on a vehicle module, or one end of the bracket 2531 without having a small base 2533 but having a mobile module (such as wheels or tracks) to enable real-time movement of the entire system. In other embodiment, the main structure unit 251 does not have the auxiliary structure unit 253.

Next, the control system of the multi-axis radar system will be further introduced below. As previous introduction, the control system of the multi-axis radar system is the control module 21, and it includes the first control module 211 and the second control module 213. FIG. 6 disclose an embodiment of the first control module 211 of the multi-axis radar system 2. Further, the FIG. 6A illustrates a schematic of the first control module 211, while the FIG. 6B illustrates an exploded view of the first control module 211.

Figure 6A:
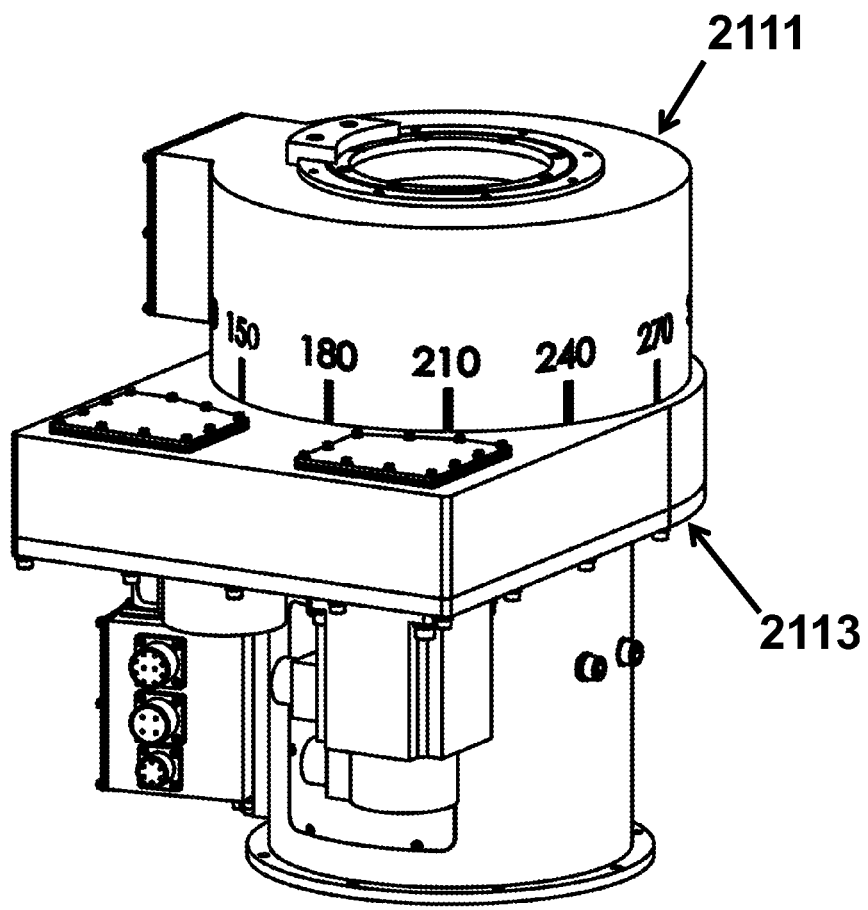
FIGS. 6A-6B illustrate an embodiment of a first control module of the present multi-axis radar system.
Figure 6B:
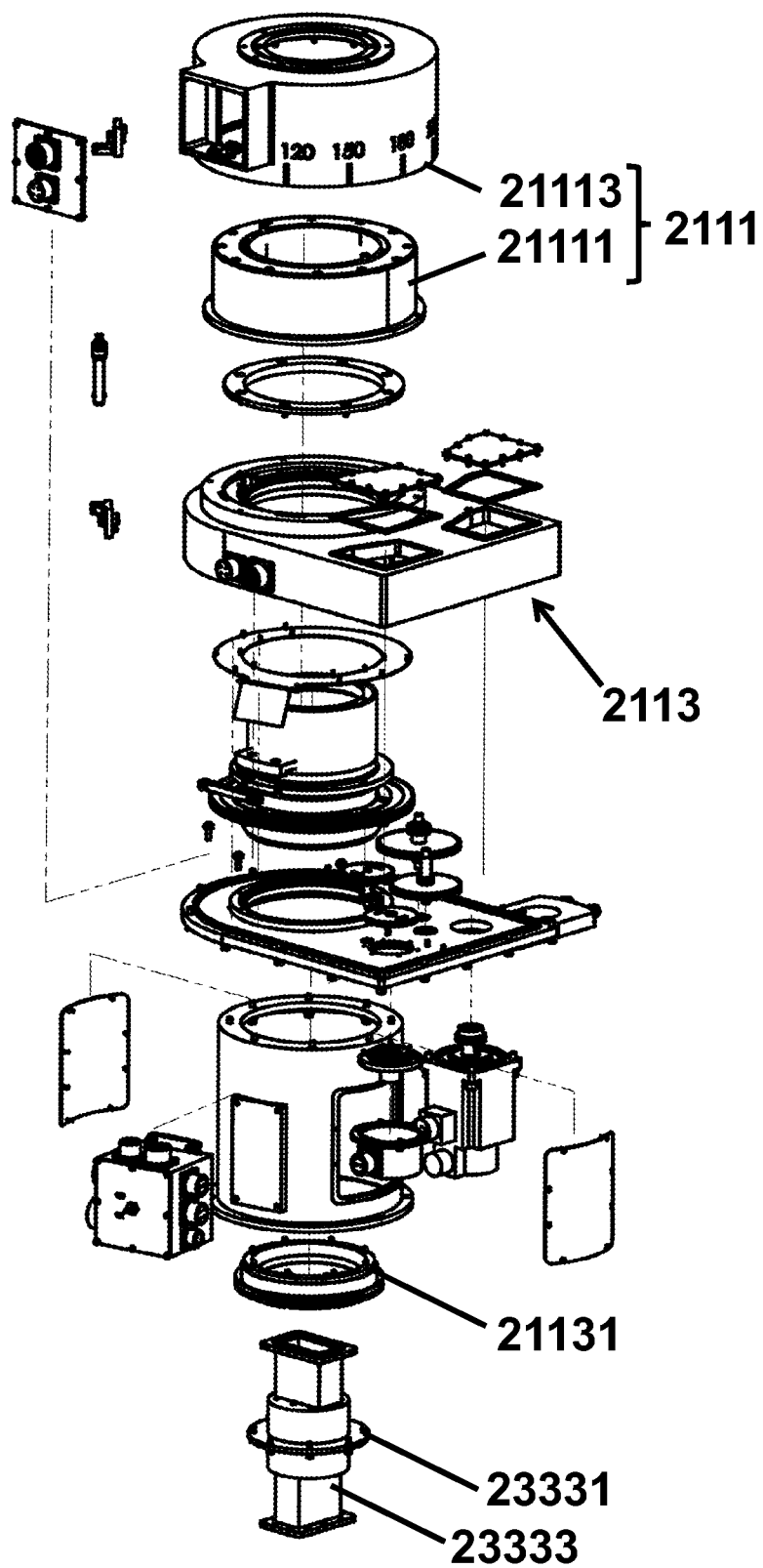
Figure 6C:
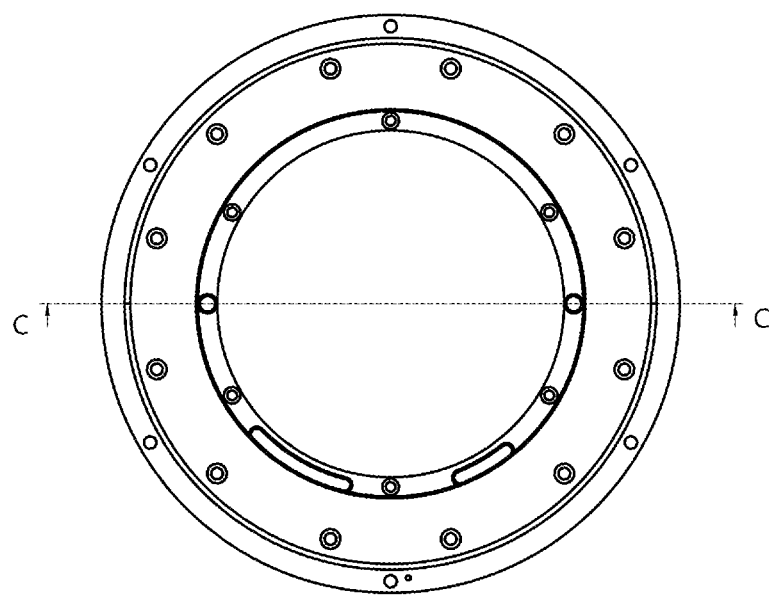
FIGS. 6C-6E illustrates an embodiment of a spin ring of the present multi-axis radar system.
Figure 6D:
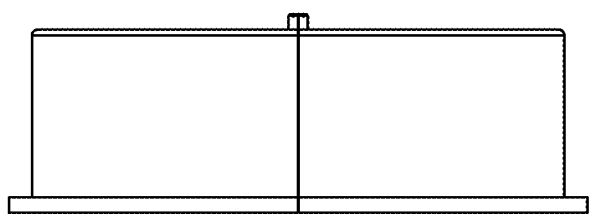
Figure 6E:
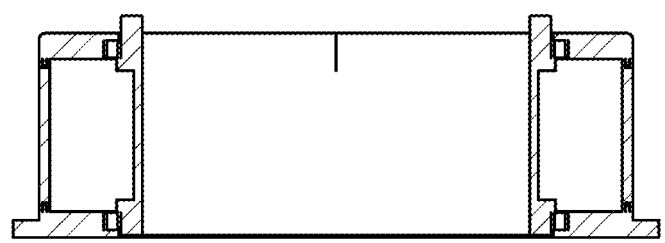

Please refer to FIGS. 2E, 6A and 6B, mounted atop the support module 25, the first control module 211 represents a second critical element for achieving multi-axis tracking. In the present embodiment, the first control module 211 is a horizontal azimuth rotating device 2111. The first control module 211 is designed with precision mechanisms, allowing seamless 360-degree rotation along the horizontal axis. This capability enables the multi-axis radar system 2 to monitor and track a target across a comprehensive two-dimensional space. The first control module 211 includes the horizontal azimuth rotating device 2111 and a first motor system 2113 having a first resolver (figure not shown). The first resolver provides absolute position of the input shaft. In the present embodiment, the resolution of the first resolver is 0.1 to 0.5 degree/bit and, preferably, is 0.11 degree/bit. Further, the horizontal azimuth rotating device 2111 has a spin ring 21111 and a case 21113. The case 21113 is configured outside the spin ring 21111, and there are markings on the case 21113 (each unit is 30 degrees) indicating the current direction of the radar. It is worth noting that the spin ring 21111 provides uninterrupted power to the second control module 213. Specifically, the horizontal azimuth rotating device 2111 of the multi-axis radar system 2 can rotate horizontally for more than 360 degrees as needed (for example, 720 degrees rotation). If conventional wires are used to supply power to the second control module 213, the wires may break due to excessive torsion. However, the spin ring 21111 of the present disclosure (see FIGS. 6C to 6D) uses a brush for contact and power transmission, so it does not have the disadvantage of using conventional wires for power transmission.

As previous description regarding FIGS. 3A and 3B, the middle part of the middle section 233 of the waveguide system 23 is configured coaxially with the first control module 211. Further details can be seen in FIG. 6B, a rotatable center 23331 of the first single-channel rotary connector 2333 is connected with the bottom interface 21131 of the first motor system 2113. Therefore, when the first motor system 2113 drives the horizontal azimuth rotating device 2111, it will further drive horizontal azimuth rotating device 2111 and second L-shaped duct 2331 to rotate synchronously. Therefore, the configuration design of the first control module 211 and the middle section 233 can ensure that the system will not be interfered with by the rotation of the horizontal azimuth rotating device 2111 of the first control module 211 when using the signal transmission of the middle section 233 of the waveguide system 23. In addition, there is a V-type O ring at the junction of the rotatable center 23331 and the bottom interface 21131, and there is a O-type O ring at the junction of the horizontal azimuth rotating device 2111 and the bottom of the second control module 213. Both V-type O ring or O-type O ring are to isolate external moisture and maintain the accuracy of the first control module 211 or the second control module 213.

Figure 7B:
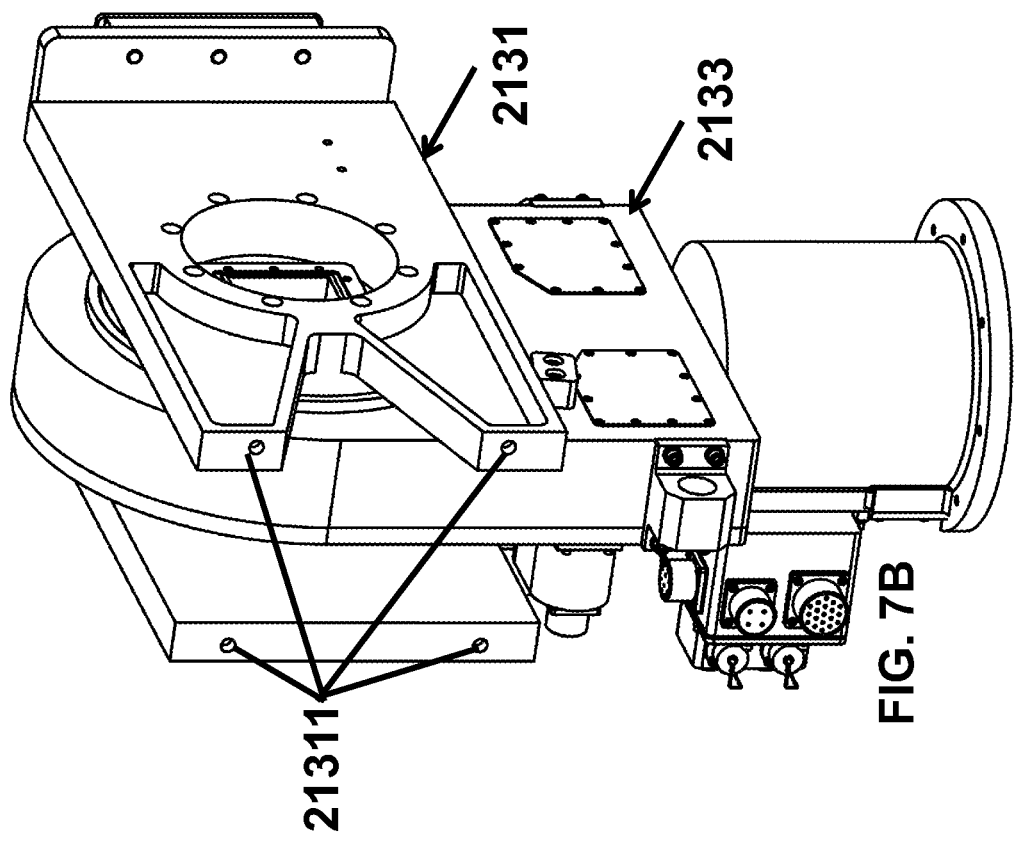
FIGS. 7A-7B illustrates an embodiment of the second control module of the present multi-axis radar system.
Figure 7A:
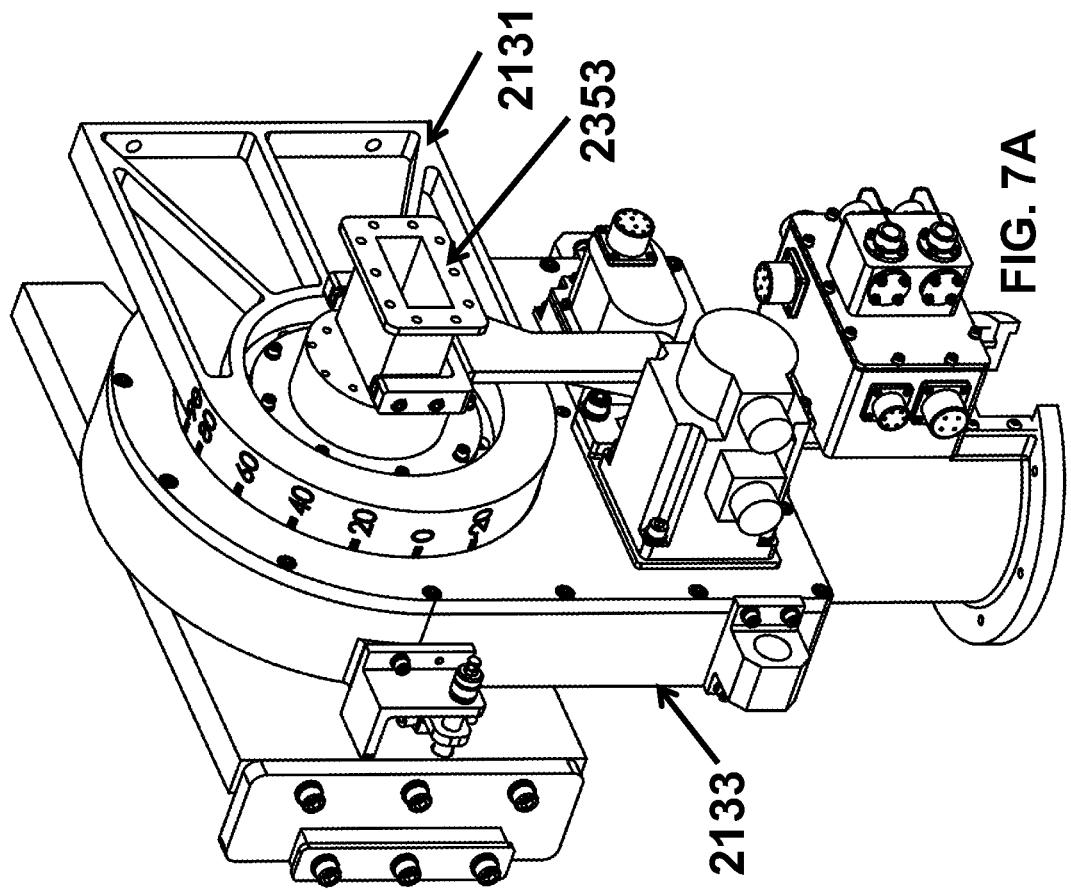

We will further introduce an embodiment of the second control module 213 below. Please refer FIGS. 2E, 7A and 7B, positioned atop the first control module 211, the second control module 213 further augments the system's tracking capabilities. The second control module 213 incorporates a vertical rotatable axis device 2131, a second motor system 2133 having a second resolver (figure not shown). In the present embodiment, the resolution of the second resolver is 0.1 to 0.5 degree/bit and, preferably, is 0.11 degree/bit. The second control module 213 introduces the ability to track targets along the vertical axis. Specifically, the vertical rotatable axis device 2131 complements the horizontal tracking provided by the first control module 211, thereby enabling the radar system to achieve full three-dimensional tracking coverage. As previous mentioned, the second control module 213 also integrates the second single-channel rotary connector 2353, specialized for the X-band frequency range. The second single-channel rotary connector 2353 operates synergistically with the vertical rotatable axis device 2131, ensuring efficient signal transmission and reception. As the figures show, it is worth knowing that a vertical rotation axis of the vertical rotatable axis device 2131 coincides with the longitudinal axis passing through the second single-channel rotary connector 2353. In addition, the vertical rotation angle range of the vertical rotatable axis device 2131 is from about −10 to +100 degrees, and preferably the vertical rotation angle range is from about 0 to +90 degrees. There is a V-type O ring at the junction of the vertical rotatable axis device 2131 and the second motor system 2133, and the V-type O ring is to isolate external moisture and maintain the accuracy of the second control module 213. Further, the vertical rotatable axis device 2131 contains four fixed points 21311 for connecting and securing the radar antenna (figure not shown) to the connection of the u-shaped duct 2355 or the u-shaped duct 4355. The weight of the radar antenna that can be carried by the vertical rotatable axis device 2131 is about ≥10 kg and ≤40 kg.

Based on the description of FIGS. 1 to 7B, it is clear to understand the system configuration and structural composition of the multi-axis radar system 2. However, the following will further supplement other features of the multi-axis radar system 2, which are the main features that make it superior to the prior radar system. The overall main structure of the multi-axis radar system 2 is composed of alloy, preferably made of stainless steel. Furthermore, in order to achieve better resistance to environmental damage, the surface of the alloy structure can be further coated with one or more layers of protective paint. In the present embodiment the surface of the alloy structure coated with two layers of protective paint. Further, the thickness of the base layer paint is 25-35 μm and the thickness of the topcoat is 60-80 μm. Therefore, the present multi-axis radar system can effectively operate normally under the following environmental conditions: (a) temperature: about −10 to +60° C.; (b) humidity: about 0 to 100% relative humidity; (c) rainfall: 4 in/hr; and (d) salt spray: no corrosion phenomena after 500 hrs in 5% salt spray.

In addition, the total weigh of the present multi-axis radar system is about ≤100 kg. Therefore, the multi-axis radar system has high mobility and can easily be moved to a better location for signal reception according to needs. Further, the multi-axis radar system can provide accurate directional orientation even in harsh environments with maximum average wind speeds of 40 knots or gusts of 50 knots, with vertical or horizontal error angles less than about 0.2 degrees. The angular velocity of the vertical or horizontal rotation of the multi-axis radar system is about ≥30 degree/ see, and its angular acceleration of vertical or horizontal rotation is about ≥30 degree/sec². Preferably, the angular velocity of the vertical or horizontal rotation of the multi-axis radar system is about ≥120 degrees/sec. The pointing accuracy of the first control module 211 (i.e., the horizontal pointing accuracy) or the second control module 213 (i.e., the vertical pointing accuracy) is about ≤0.5 degree. The advantages achieved by this system, such as fast acceleration and small positional errors in both axes, are mainly due to the high precision of the gears used in the first control module 211 and the second control module 213. Specifically, the AGMA Quality Number of the gears is ≥8 or the JIS Quality Number is ≤6.

Finally, the following further explains the advantages of the present multi-axis radar system disclosed here compared to the prior radar system. First, regarding the environmental adaptation, one of the fundamental aspects of the base design is its adaptability to varying environmental conditions. Weather-resistant coatings and materials are employed to protect against corrosion and degradation caused by exposure to moisture, extreme temperatures, and other environmental factors. This adaptability is essential for maintaining the radar system's long-term operational efficiency and reliability, especially in outdoor installations or remote locations. Second, regarding the mounting flexibility, the base design is engineered with mounting flexibility in mind. It can be securely attached to various structures, such as poles, platforms, or fixed structures, depending on the intended application. This adaptability ensures that the radar system can be deployed in diverse settings, ranging from military installations to surveillance networks and meteorological stations.

In summary, the base design of the multi-axis radar system serves as a critical cornerstone, providing not only structural support and stability but also protection against environmental elements. By incorporating a cylindrical body and a versatile bracket device, the base design optimally accommodates the intricate components that constitute the radar system. This thoughtfully engineered base ensures the longevity, accuracy, and reliability of the multi-axis radar system's operation, making it suitable for a wide array of applications across various industries. Third, regarding the system integration and operation, the effectiveness of the multi-axis radar system stems from the seamless integration of its components, resulting in a harmonious operation that enables precise, versatile, and reliable target tracking across multiple axes. Forth, regarding the coordinated mechanical movement, the heart of the system's integration lies in the coordinated mechanical movement of the control modules. As the multi-axis radar system tracks targets, the horizontal azimuth rotating device 2111 of the first control module 211 executes smooth azimuth and elevation rotations. This rotational movement is complemented by the vertical rotatable axis device 2131 of the second control module 213, which enables vertical tracking. The synchronized motion of these axis devices ensures that targets are tracked across a comprehensive three-dimensional space. Fifth, regarding the data integration and coordination, integral to the system's effectiveness is the optimized integration of tracking data. As the first control module 211 and the second control module 213 tack targets along their respective axes, the waveguide system 23 facilitates the seamless transmission and reception of radar signals. The single-channel rotary connectors, the horizontal azimuth rotating device 2111 and the vertical rotatable axis device 2131 ensure that data from both horizontal and vertical tracking components converge seamlessly. The result is a comprehensive dataset that accurately represents the target's position and trajectory in relation to the present radar system. Moreover, the synergy between mechanical movement and data integration culminates in real-time tracking accuracy. As the present radar system monitors targets across multiple axes, the instantaneous data convergence allows for the precise determination of a target's position and movement. The integration of horizontal and vertical tracking data eliminates blind spots and enhances accuracy, offering a complete and detailed understanding of the target's behavior within the radar system's operational area.

In summary, the integration and operation of the present multi-axis radar system is a breakthrough in target tracking technology. By synchronizing mechanical movement with data integration, the present multi-axis radar system offers real-time accuracy, comprehensive tracking, and versatile applications. The harmonious interaction of components results in a radar solution that redefines tracking capabilities across multiple axes, catering to diverse industries and ensuring heightened situational awareness. The integrated operation of the present multi-axis radar system opens a wide array of applications, from military surveillance and defense to air traffic control, meteorology, and beyond. The radar system's ability to track targets from all directions provides unprecedented insights and situational awareness. The seamless coordination of tracking data enhances decision-making processes, ensuring that critical actions can be taken quickly and accurately.

The invention claimed is:

1. A multi-axis radar system, comprising:
   a waveguide system, comprising:
      a footer section, a middle section, and a top section, wherein the footer section and the middle section can be rotated horizontally relative to each other, and the middle section and the top section can be rotated vertically relative to each other,
   a support module having a cylindrical body, wherein the footer section of the waveguide system enters from a side of the support module and exits upwards from the top of the support module to connect with the middle section of the waveguide system;
   a first control module, comprising:
      a horizontal azimuth rotating device having a spin ring; and
      a first resolver,
      wherein a portion of the middle section of the waveguide is coaxially arranged with the horizontal azimuth rotating device, and the first control module is installed on the support module; and
   a second control module, comprising:
      a vertical rotatable axis device; and
      a second resolver,
      wherein a portion of the top section of the waveguide system is coaxially arranged with the vertical rotatable axis device, wherein the second control module is installed on the horizontal azimuth rotating device.

2. The multi-axis radar system as claim 1, wherein the support module comprises a bracket device.

3. The multi-axis radar system as claim 1, wherein the middle section comprises a first single-channel rotary connector used to connect with the footer section.

4. The multi-axis radar system as claim 1, wherein the top section comprises a second single-channel rotary connector used to connect with the middle section.

5. The multi-axis radar system as claim 1, wherein a loadable weight of the vertical rotatable axis device is about ≥10 kg.

6. The multi-axis radar system as claim 1, wherein a rotation angle of the horizontal azimuth rotating device is 360 degrees.

7. The multi-axis radar system as claim 6, wherein the horizontal azimuth rotating device does not have a maximum rotation angle.

8. The multi-axis radar system as claim 1, wherein a rotation angle of the vertical rotatable axis device is about −10 to +100 degree.

9. The multi-axis radar system as claim 1, wherein a frequency of the signal transmitted by the waveguide system is about 2 to 4 GHz.

10. The multi-axis radar system as claim 1, wherein a frequency of the signal transmitted by the waveguide system is about 7 to 11.2 GHz.

11. The multi-axis radar system as claim 1, wherein an insertion loss of the waveguide system is about ≤0.4 dB.

12. The multi-axis radar system as claim 1, wherein a gear used in the horizontal azimuth rotating device or the vertical rotatable axis device has a precision and the precision is ≥AGMA Quality No. 8.

13. The multi-axis radar system as claim 1, wherein a gear used in the horizontal azimuth rotating device or the vertical rotatable axis device has a precision and the precision is ≤JIS Quality No. 6.

14. The multi-axis radar system as claim 1, wherein a resolution of the first resolver or the second resolver is 0.1 to 0.5 degree/bit.

15. The multi-axis radar system as claim 1, wherein an angular velocity of vertical or horizontal rotation of the multi-axis radar system is about ≥30 degree/sec.

16. The multi-axis radar system as claim 1, wherein an angular velocity of vertical or horizontal rotation of the multi-axis radar system is about ≥120 degree/sec.

17. The multi-axis radar system as claim 1, wherein a weigh of the multi-axis radar system is about ≤100 kg.

18. The multi-axis radar system as claim 1, wherein a vertical or horizontal error angle is less than about 0.2 degrees when the multi-axis radar system is placed in an environment with maximum average wind speeds of 40 knots or gusts of 50 knots.

19. The multi-axis radar system as claim 1 further comprises:
  a computer, wherein the computer is connected with an end of the footer section of the waveguide system; and
  an antenna, wherein the antenna is connected with a free end of the top section of the waveguide system,
  wherein the computer is electrically connected with the multi-axis radar system.

20. The multi-axis radar system as claim 19, wherein the antenna is ≥10 kg.

* * * * *